F. HARDINGE.
LENS MEASURING INSTRUMENT.
APPLICATION FILED NOV. 17, 1906. RENEWED AUG. 22, 1908.
900,531. Patented Oct. 6, 1908.
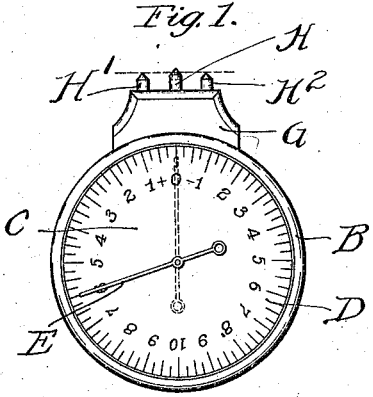
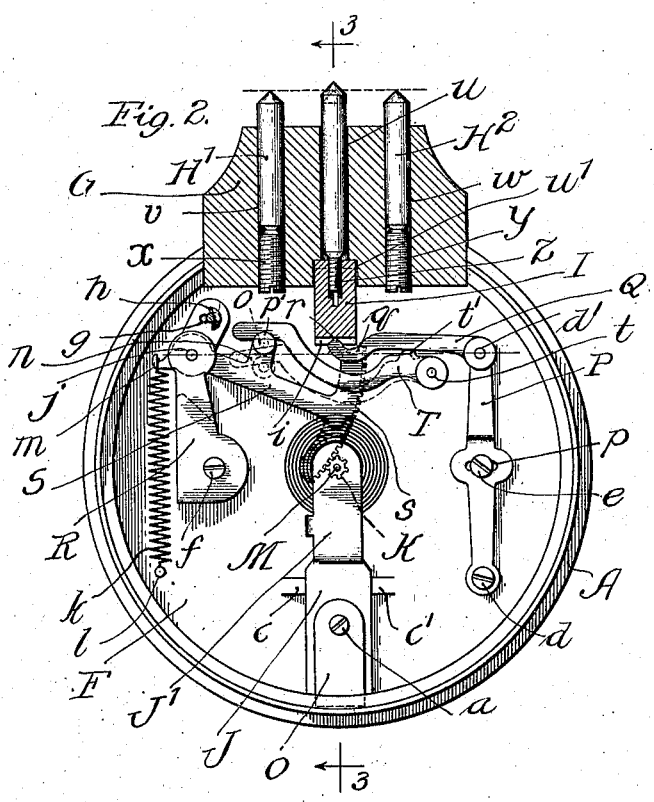
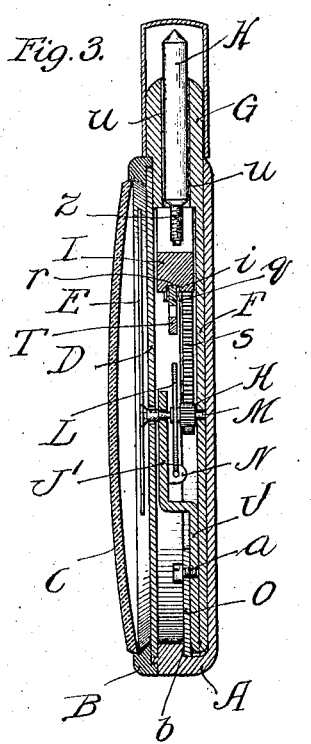
Witnesses
Leonard W. Novander.
George E. Higham.
Inventor
Franklin Hardinge
By Charles A. Brown
Attorney

UNITED STATES PATENT OFFICE.

FRANKLIN HARDINGE, OF CHICAGO, ILLINOIS, ASSIGNOR TO GENEVA OPTICAL COMPANY, OF CHICAGO, ILLINOIS, A CORPORATION.

LENS-MEASURING INSTRUMENT.

No. 900,531.   Specification of Letters Patent.   Patented Oct. 6, 1908.

Application filed November 17, 1906, Serial No. 343,791. Renewed August 22, 1908. Serial No. 449,822.

*To all whom it may concern:*

Be it known that I, FRANKLIN HARDINGE, citizen of the United States, residing at Chicago, in the county of Cook and State of Illinois, have invented a certain new and useful Improvement in Lens-Measuring Instruments, of which the following is a full, clear, concise, and exact description, reference being had to the accompanying drawings, forming a part of this specification.

My invention relates to lens measuring instruments and may be considered as an improvement over the lens measuring instrument disclosed in my Patent No. 703,725 dated July 1, 1902. In the device of this patent the multiplying lever arrangement is such that the measuring points must be quite a distance apart in order that the indicating lines on the dial may be reasonably far apart and the throw of the needle sufficient so that accurate reading and measurement may result. However, when the measuring points are so far apart, the measuring device cannot very well be used for measuring small lenses or for measuring small pieces of broken lenses.

The object of my present invention, therefore, is to provide multiplying lever mechanism and arrangement thereof so that the measuring points may be brought closer together to adapt the instrument for measuring small lenses or small pieces of broken lens, the improved lever arrangement being such that the distance apart of the dial marks and the throw of the needle will be increased in spite of the fact that the points are brought closer together and, therefore, enabling the indication to be read with much greater accuracy.

With the exception of my improved lever mechanism, the device is practically of the same construction as that shown in the patent, and in the accompanying drawing—Figure 1 is a face view of the instrument, showing the measuring points and needle in their normal position and showing in dotted lines the position assumed when the points are in the same plane; Fig. 2 is an enlarged face view, the crystal, frame, needle and dial being removed, and the point supporting frame being in section, and Fig. 3 is a sectional view taken on line 3—3 of Fig. 2.

The casing A is provided with a bezel B in which is set a crystal C. The graduated dial D is secured to the edge of the casing A by the bezel B, and E is the pointer movable over the face of the dial. At the bottom of the casing A is the supporting plate F on which the various moving parts are mounted. Secured to the upper end of this supporting plate and extending through the casing walls is the pin supporting block G in which are mounted the movable measuring pin or point H and the comparatively immovable pins or points H' and H². The pin H is adapted to slide readily in its channel $u$, while the pins H' and H² are held in adjusted position by their frictional engagement with the walls of their compartments $v$ and $w$ respectively, the lower ends of these compartments being threaded to receive the adjusting screws $x$ and $y$. The lower end of the pin H has a threaded reduced extension $z$ engaged by the friction spring nut I, whose upper end plays in the enlarged compartment $u'$. When the supporting plate F is stamped, an extension J left thereon is subsequently bent over and its end J' offset, as shown, to form a compartment with the plate F for receiving the pinion K and the hair spring L, which pinion and hair spring are mounted on the spindle M at whose outer end is supported the needle E. The free end of the hair spring is secured to the lug N which is integral with the part J'. To hold the lower end of the frame in place, a locking plate O is provided which is secured at one end to the part J by the screw $a$ and which at its lower end engages below the shoulder $b$ provided in the rim of the casing A. Tongues $c$ and $c'$ are also stamped up from the part F between the ends of which the part J is held.

P is a bent arm pivoted at its lower end to the plate F by the screw $d$, being pivoted at its upper end at $d'$ to the lever arm Q whose front end $q$ is hook-shaped, as shown, the end thereof being beveled and rounded to form the contact point $r$ which engages in the channel $i$ cut in the head of the friction nut I. Between the ends of the lever P is the slot $p$ through which engages the screw $e$ by means of which the lever P may be secured in any adjusted position. At the left side of the casing is the pivot frame R pivoted to the frame F by the screw $f$. At the upper end of this pivot frame is the slot $g$ through which passes the screw $h$ into engagement with the plate F, the slot allowing adjustment of the lever frame about its pivot and the screw serving to secure the frame in any adjusted position. Pivoted at the point $j$ to the frame R is the lever arm S terminating at its right end in the segmental rack $s$ engaging with the needle pinion K. A tension spring $k$ extending between the fixed pin $l$ and the hook arm $m$ extending from the lever arm S tends to hold the arm and segmental rack in an upper position. Also extending from the arm S between the pivot point $j$ and segmental rack is an extending arm $n$ from which extends forwardly the pin $o$ terminating in the retaining flange $p'$. Another lever arm T is pivoted to the frame F at $t$ suitably placed below the lever Q. The lever arm T is bent, as shown, to clear the bent end of the lever Q, and the end of this lever T engages the pin $o$ between the arm end $n$ and the flange $p'$. A pivot point or lug $t'$ extends forwardly from the lever arm T between the pivot point $t$ and the end of this arm so that it will engage the underside of the lever arm Q at about its middle point. With this arrangement of levers, it will be seen that the inward movement of the measuring pin H will be transmitted through the lever arms Q, T, and S to the segmental rack $s$ and to the needle shaft to cause the needle to travel over the dial. Upon release of the measuring pin, the spring $k$ will return the segment lever and the other levers to their normal position, and the needle will be returned to its normal position, this return movement of the needle being assisted by the hair spring L, this hair spring serving also to take up all backlash between the segment rack and the needle pinion.

The dial may be graduated in any suitable manner, but is preferably uniformly graduated, as is shown in Fig. 1. The lever supporting frames may be so adjusted that when the points are brought against a plain surface, the needle will indicate zero. If a convex lens or surface is to be measured, the pointer will be moved to the plus (+) side of the dial, whereas if the points are brought against a concave lens or surface, the needle will indicate on the minus (—) side in the manner well understood in the art, and the proper adjustment for the levers is determined by testing the instrument with lenses or surfaces of known curvature. In this present device as in the device in the patent referred to, the center of the pivot $d''$, the pivot points $t'$ and $r$, the top edge of the pin $o$ and the pivot $j$ will be in the same horizontal plane when the measuring pin points are in the same plane, and therefore, the lever movements at either side of the zero position are practically in a straight line, and the successive intervals through which the point $r$ is moved on either side of this line of centers by convex and concave surfaces are uniform and are directly proportional to the variations in curvature, and this particular arrangement allows the use of the uniformly graduated scale. The particular arrangement of the levers, pivots and contacts also compensates for the difference in focal length of convex the concave lenses. This is brought about by the fact that the levers S and T are arranged at an angle with each other, as shown, the leverage of the arm T becoming greater as the arm S is moved rearwardly, or in other words, as the pin $o$ moves below the line of centers. This causes the pointer or needle E to be moved through an arc to the left by a convex lens slightly greater than the arc through which it will be moved to the right by a concave lens of the same radius of curvature. By this arrangement, therefore, convex and concave surfaces of the same radius of curvature but with different focal length will be accurately measured on a uniformly divided scale.

By the interposition of the additional lever arm Q instead of directly connecting the lever arm T with the pin $o$, as is the case in the patent, the deflection of the needle corresponding to any movement of the levers, may be greatly multiplied to any extent to allow the use of larger scale divisions and more close spacing of the measuring pins, adapting the device to the measurement of very small lenses or pieces of broken lenses. This multiplication is evident from the use of the interposed lever arm Q and the position of the point $t'$ close to the pivot point $t$ of the lever arm T.

In assembling the instrument, the lever supporting frames are approximately adjusted to produce correct readings, and the dial pointer and crystal are then put in place. To get absolutely correct adjustment, it is necessary only to turn the movable measuring pin H in the spring nut, thereby adjusting the point of the middle pin with respect to the outside pins. When the device is, therefore, assembled, it is unnecessary for the user to take it apart to obtain an exact adjustment, but this adjustment can be readily accomplished by the mere turning of the movable measuring pin, and the wear of the pins can be compensated for in the same manner.

I do not wish to be limited to this precise arrangement of the various supporting parts or the multiplying levers, as changes may readily be made without departing from the scope of the invention, the main feature being the proper arrangement of a sufficient number of multiplying levers, so that the scale divisions may be of sufficient size and measuring points brought sufficiently close together to enable measurement of small lenses without in any way deducting from the efficiency or accuracy of the readings or measurements.

I claim as new and desire to secure by Letters Patent:

1. In a measuring instrument of the class described, the combination of relatively fixed contact members, a movable contact member, an indicating pointer, a lever pivoted at one end and engaging at its other end with the movable contact member, a second lever pivoted at one end and having driving connection at its other end with the pointer, and a third lever pivoted at one end, the other end of the lever engaging the second lever at an intermediary point thereof and said third lever engaging an intermediary point of the first lever.

2. In a measuring instrument of the class described, the combination of comparatively fixed measuring contact members, a relatively movable measuring contact member, an indicating pointer, and multiplying lever mechanism comprising three pivoted levers the first lever having contact with the second lever and the second lever having contact with the third lever, such levers being so arranged that the pivot centers of two of the levers and the contact points thereof lie in a straight horizontal line when the points of the contact members are in a horizontal plane.

3. In a measuring instrument of the class described, the combination of comparatively fixed measuring contact members, a relatively movable measuring contact member, an indicating pointer a lever pivoted to the instrument frame and having direct connection with the movable member, a second lever pivoted to the instrument frame and having driving connection with the pointer, and a third lever pivoted to the instrument frame and having contact engagement with the first and second levers, the pivot centers of the first and second levers and the engagement contact points between said levers and the third lever lying all in the same horizontal plane when the points of the measuring contact members lie all in another horizontal plane.

4. In a measuring instrument of the class described, the combination of fixed measuring contact members, a relatively movable measuring contact member, an indicating pointer, a pivoted lever having direct contact with the movable member, a second pivoted lever having direct driving connection with the pointer, and additional lever mechanism having contact engagement with the first and second levers for transferring movement from one of said levers to the other, the pivot points of the first and second levers, the contact of the first lever and the contacts of the additional lever mechanism with the first and second levers being all in the same horizontal plane when the points of the measuring contact members are in a common horizontal plane.

5. In a measuring instrument of the class described, the combination of fixed measuring contact members, a relatively movable measuring contact member, an indicating pointer, and multiplying lever mechanism comprising three pivoted levers the first lever having contact with the second and the second lever having contact with the third lever, said levers being so arranged that the pivot centers of two of the levers and the contact points of all the levers lie in a straight horizontal line when the points of the contact members are in a horizontal plane.

In witness whereof, I hereunto subscribe my name this 14th day of November A. D., 1906.

FRANKLIN HARDINGE.

Witnesses:
  CHARLES J. SCHMIDT,
  GEORGE E. HIGHAM.